United States Patent
Brun et al.

Patent Number: 5,494,871
Date of Patent: Feb. 27, 1996

[54] PROCESS FOR PREPARING A PREPOLYMERIZED OLEFIN POLYMERIZATION CATALYST

[75] Inventors: Claude Brun, Idron; Michel Avaro, Pau, both of France

[73] Assignee: Elf Atochem S.A., Puteaux, France

[21] Appl. No.: 384,400

[22] Filed: Feb. 3, 1995

Related U.S. Application Data

[62] Division of Ser. No. 38,279, Mar. 29, 1993, abandoned.

[30] Foreign Application Priority Data

Mar. 27, 1992 [FR] France ................ 92 03733

[51] Int. Cl.⁶ .............................................. C08F 4/649
[52] U.S. Cl. ................... 502/108; 502/103; 502/106; 502/109; 526/124.3; 526/901; 526/904
[58] Field of Search ...................... 502/103, 106, 502/108, 109; 526/124, 125, 901, 904

[56] References Cited

U.S. PATENT DOCUMENTS

| | | | |
|---|---|---|---|
| 4,187,385 | 2/1980 | Iwao et al. | 526/128 |
| 4,325,837 | 4/1982 | Capshaw et al. | 252/429 B |
| 4,326,988 | 4/1982 | Welch et al. | 252/429 B |
| 4,579,836 | 4/1986 | Arzoumanidis et al. | 502/133 |
| 4,617,284 | 10/1986 | Matsuura et al. | 502/111 |
| 4,642,328 | 2/1987 | Morterol et al. | 526/125 |
| 4,657,882 | 4/1987 | Karayannis et al. | 502/115 |
| 4,916,099 | 4/1990 | Sasaki et al. | 502/126 |
| 4,987,212 | 1/1991 | Morterol et al. | 526/348.4 |
| 5,112,785 | 5/1992 | Brun et al. | 502/108 |
| 5,208,109 | 5/1993 | Bailly et al. | 428/402 |

FOREIGN PATENT DOCUMENTS

| | | |
|---|---|---|
| 1116795 | 1/1982 | Canada . |
| 99774 | 2/1984 | European Pat. Off. . |
| 174104 | 3/1986 | European Pat. Off. . |
| 211624 | 2/1987 | European Pat. Off. . |
| 232643 | 8/1987 | European Pat. Off. . |
| 435332 | 7/1991 | European Pat. Off. . |
| 52-139184 | 11/1977 | Japan . |
| 55-86805 | 7/1980 | Japan . |
| 59-8706 | 1/1984 | Japan . |
| 59-64611 | 4/1984 | Japan . |
| 63-95208 | 4/1988 | Japan . |
| 1-118504 | 5/1989 | Japan . |

*Primary Examiner*—Romulo H. Delmendo
*Attorney, Agent, or Firm*—Burns, Doane, Swecker & Mathis

[57] ABSTRACT

A stable, long-lived catalyst composition, well suited for the polymerization of olefins, e.g., of ethylene, comprises intimate admixture of particulates of an olefin prepolymer and a catalytically effective amount of particles of a metallic olefin polymerization catalyst, such olefin prepolymer particulates having a particle size distribution narrower than the particle size distribution of the metallic catalyst particles.

9 Claims, No Drawings

PROCESS FOR PREPARING A PREPOLYMERIZED OLEFIN POLYMERIZATION CATALYST

This application is a divisional of application Ser. No. 08/038,279, filed Mar. 29, 1993 now abandoned.

BACKGROUND OF THE INVENTION

1. Field of the Invention

The present invention relates to novel catalysts for the polymerization of olefins which comprise particulates of a prepolymer prepared, for example by the prepolymerization of ethylene, either alone or in admixture with an alpha-olefin having from 3 to 8 carbon atoms, in the presence of a particulate catalyst system including, on the one hand, a catalyst component containing titanium, magnesium, chlorine and, where appropriate, an electron donor or electron acceptor and, on the other hand, a cocatalyst. Such catalyst, essentially in the form of the prepolymer, is useful for the polymerization of olefins in the absence of supplementary added cocatalyst; it is characterized in that it has a particle size distribution narrower than the particle size distribution of the catalyst component, per se.

2. Description of the Prior Art

It is known to this art that during the polymerization of olefins, particularly in the instance of conducting the polymerization in the gas phase, in the presence of a solid particulate catalyst, such as those based on titanium supported on magnesium chloride, the constituent particulates are reduced in size into finely divided catalyst particles, whether by bursting or by wear/attrition, which finely divided particles promote the formation of correspondingly finely divided polymer particles.

Too, in the gas phase polymerization reactor, it is these fine particles which become the most highly charged with static electricity. These highly electrostatically charged fine particles stick to the reactor walls and promote the formation of crusts by gelling. The microfine particles also have a tendency to disengage from the fluidized bed, to promote plugging in the recycling circuits. Finally, in powder transport systems, and fine particles also become charged by static electricity and may present a risk of violent electrostatic discharge during transfers.

To overcome the above disadvantages, it has been proposed to convert the catalyst component into prepolymer form. In this event, an olefin is prepolymerized under mild conditions, in the presence of such catalyst component, to provide a low degree of polymerization progression, on the order of a few tens of grams of polyolefin formed per gram of catalyst component. This active prepolymer is then used as a catalyst system for the polymerization of olefins. Such technique permits consolidating the catalyst component, thus reducing the subsequent formation of finely divided polymer particles over the course of polymerization. However, this technique does not permit removing the fine particles initially present in the catalyst component or formed during prepolymerization, despite taking all precautions.

Ideally, a catalyst particle effects formation of a prepolymer particle which, in turn, is converted into a polymer particle. During the polymerization, the catalyst particle grows, essentially proportionally to the (productivity)$^{1/3}$. The particle size distribution curves of the catalyst and of the polymer are homothetic. Thus, the smaller the proportion of fine particles contained in the catalyst component, the smaller the amount of fine particles in the final polymer. These homothetic particle size distributions may be defined by a mathematical expression which makes it possible to quantify the particle size distribution or the range which is designated SPAN. The SPAN corresponds to $$\frac{D90 - D10}{(D50)},$$

with D90, D50 and D10 being the respective diameters below which there are 90%, 50% and 10% by weight of the particles, respectively.

SUMMARY OF THE INVENTION

Thus, a major object of the present invention is limiting, to the greatest possible extent, the formation of finely divided particulates of the catalyst component to correspondingly reduce the formation of fine particles in the final polymer. This catalyst prepolymer, necessarily having a particle size distribution narrower than that of the catalyst component employed for the prepolymerization, is particularly desirable because its restricted particle size distribution is essentially due to the removal of the finely divided particles therefrom. Such catalyst prepolymer, the degree of progression of which, namely, the number of grams of prepolymer formed per gram of catalyst component, preferably is less than 250 g of prepolymer per gram of catalyst component, and usually has a SPAN reduced by at least 15% compared with the SPAN of the catalyst component. This reduction in the SPAN is essentially due to the removal of the finely divided particles from the catalyst component.

Briefly, the present invention features removal of the fine particles from the catalyst component, paradoxically, by removing the coarse particles upon completion of the prepolymerization, same being conducted in the gas phase or in suspension and in the presence of thermoplastic resin as filler powder, of either ethylene alone or in admixture with an alpha-olefin comonomer having from 3 to 8 carbon atoms, and also in the presence of the catalyst component.

DETAILED DESCRIPTION OF PREFERRED EMBODIMENTS OF THE INVENTION

More particularly according to the present invention, the characterizing feature thereof is the removal of the finest particles from the catalyst component, which, during the downstream polymerization of the olefins, are known to generate correspondingly finely divided polymer particles.

The characteristic of this invention that permits removing such fine particles is conducting the subject polymerization in the presence of a filler powder such as a thermoplastic resin, which is, at least partially, removed upon completion of the prepolymerization.

In general, the filler powder must have at least one particle size fraction in which the particle size is greater than the coarse particles of catalyst prepolymer, to permit it to be removed easily.

Unexpectedly, it has also been found that the majority of the fine particles in the catalyst prepolymers are agglomerated onto the particles of the thermoplastic resin. In order to remove the prepolymer fine particles thus formed, it then suffices to remove at least the coarsest of said filler thermoplastic resin particles by any known means, such as by sieving, and retaining such particles on the screen of the sieve.

In particular, the process for the production of the catalyst prepolymer comprises prepolymerizing, in the gas phase or in suspension, ethylene, either as such or in admixture with an alpha-olefin comonomer having from 3 to 8 carbon atoms, typically in the presence of hydrogen and nitrogen, as well as in the presence of a catalyst system including, on the one hand, a catalyst component containing titanium, magnesium, chlorine and, where appropriate, an electron donor or electron acceptor and, on the other hand, of a cocatalyst, such prepolymerization being carried out in the presence of a filler powder and wherein, after formation of the prepolymer, the powdered filler particles are at least partially removed.

To facilitate this removal, a filler powder is selected which has an average particle size greater than:

D50 of the catalyst x (degree of progression of prepolymerization)$^{1/3}$.

To separate off the filler powder easily, it is desirable to select a filler powder such that its D10 is greater than:

D90 of the catalyst x (degree of progression of the prepolymer)$^{1/3}$.

The catalyst component is per se known to this art and may be selected from any commercial catalyst component containing titanium, chlorine and magnesium. It is typically the product of the combination of at least one titanium compound, a magnesium compound, chlorine and, optionally, an aluminum compound and/or an electron donor or electron acceptor, as well as of any other compound useful for such type of component.

The titanium compound is typically selected from among the chlorinated titanium compounds having the formula $Ti(-OR)_xCl_{4-x}$, in which R is a $C_1$ to $C_{14}$ aliphatic or aromatic hydrocarbon radical, or $COR_1$, wherein $R_1$ is a $C_1$ to $C_{14}$ aliphatic or aromatic hydrocarbon radical, and x is a number ranging from 0 to 3.

The magnesium compound is typically a compound of the formula $Mg(OR_2)_nCl_{2-n}$, in which $R_2$ is hydrogen or a straight-chain or cyclic hydrocarbon radical and n is a number less than or equal to 2.

The chlorine may directly emanate from the titanium halide and/or the magnesium halide. It may also emanate from an independent chlorinating agent, such as hydrochloric acid or an organic halide, such as butyl chloride.

The electron donor or electron acceptor is a liquid or solid organic compound known to this art as comprising the composition of the subject catalysts. The electron donor may be a monofunctional or polyfunctional compound, advantageously selected from among the aliphatic or aromatic carboxylic acids and their alkyl esters, aliphatic or cyclic ethers, ketones, vinyl esters, acrylic derivatives, in particular alkyl acrylates or alkyl methacrylates, and silanes. Particularly exemplary such electron donors include methyl paratoluate, ethyl benzoate, ethyl acetate or butyl acetate, ethyl ether, ethyl para-anisate, dibutyl phthalate, dioctyl phthalate, diisobutyl phthalate, tetrahydrofuran, dioxane, acetone, methyl isobutyl ketone, vinyl acetate, methyl methacrylate and the silanes, such as phenyltriethoxysilane, and aromatic or aliphatic alkoxysilanes.

The electron acceptor is advantageously a Lewis acid, preferably selected from among the aluminum chlorides, boron trifluoride, chloranil or alkyl aluminum and alkyl magnesium compounds.

The catalyst component is in the form of a complex between at least Mg, Ti and Cl, the titanium being in the form of chlorinated $Ti^{IV}$, $Ti^{III}$ or a mixture of the two, if appropriate with an electron donor or electron acceptor.

The prepolymerization cocatalyst is typically selected from among the alkylaluminum compounds of general formulae $AlR_xH_z$ and $AlR_xCl_yH_z$, wherein x+z and x+y+z=3 and in which R is a straight-chain, branched or cyclic hydrocarbon radical having from 1 to 14 carbon atoms. Exemplary thereof are $Al(C_4H_9)_3$, $Al(C_2H_5)_3$, $Al(C_4H_9)_2H$, $AlCl(C_2H_5)_3$, $Al(C_6H_{13})_3$, $AlCl(C_4H_9iso)_2$. The aluminoxanes and aluminosiloxanes are also illustrative.

The gas phase prepolymerization of ethylene, whether as such or in admixture with an alpha-olefin having from 3 to 8 carbon atoms, is carried out in the presence of a filler powder comprising a thermoplastic resin, typically that of a polyolefin and more particularly polypropylene, polyethylene or a copolymer of ethylene and an alpha-olefin preferably having from 3 to 8 carbon atoms. The size of the filler powder particles is selected as a function of the desired degree of progression of the prepolymer and of the size of the catalyst. For a degree of progression of 100 g/g of catalyst and a catalyst having a D50 of 50 μm, the average size of the filler powder ranges from 300 to 2,000 μm. The filler powder is usually present in an amount constituting from about 5% to 80% by weight of the catalyst prepolymer obtained upon completion the prepolymerization, i.e., comprising the prepolymer formed plus the filler powder. Other than the fact that the filler powder facilitates the dispersion of the catalyst component during the prepolymerization, its essential function according to the invention is to permit the fixing of the prepolymer finely divided particulates thereto. These prepolymer fines are usually smaller than 100 μm.

The prepolymerization may be carried out entirely in the gas phase. Such prepolymerization is conducted in a stirred reactor. Ethylene, or a mixture of ethylene and an alpha-olefin, is polymerized in the presence of a chain limiter, optionally nitrogen as a diluent, and a cocatalyst selected from among the alkylaluminum compounds known for this purpose. The polymerization temperature typically ranges from 0° to 110° C. and preferably ranges from 20° to 60° C. at a total pressure of less than 20 bars absolute, essentially provided by an inert gas. The monomer feed into the reactor is controlled. A desirable feed rate is less than or equal to 500 $Nl \times h^{-1} \times g^{-1}$ of catalyst. The filler powder is introduced at any stage of the prepolymerization, but preferably at the beginning of prepolymerization.

When the prepolymerization has been completed, namely, when the degree of progression of polymerization has been attained, all or a portion of the filler powder is removed. Preferably, the particle size fraction of the dry mixture which has a particle diameter larger than D90 of catalyst x (degree of progression of the prepolymer)$^{1/3}$ is removed. This fraction contains a large proportion of the filler powder.

The prepolymerization may be carried out in suspension in a hydrocarbon, with stirring, in a turbulent regime. Ethylene is prepolymerized, if appropriate in the presence of a chain limiter and of a cocatalyst selected from among the alkyl aluminum compounds known for this purpose, at a temperature ranging from 0° to 110° C., preferably from 20° to 60° C., under a total pressure of less than 20 bars absolute, essentially provided by an inert gas, such as nitrogen. It is advantageous to control the monomer feed into the reactor. A desirable average feed rate is less than or equal to 500 $Nl \times h^{-1} \times g^{-1}$ of catalyst. The suspension prepolymerization is continued until a degree of prepolymerization suitable for the subsequent polymerization process is attained, the "degree of prepolymerization" being defined as the ratio of the sum of the weight of prepolymer formed plus the weight of catalyst used to the weight of catalyst used.

An amount of filler powder is added at any stage in the prepolymerization. At the end of prepolymerization, the mixture of filler powder/prepolymer is recovered dry under nitrogen after evaporation, it being permitted for said evaporation to be carried out before or after the addition of filler powder.

The prepolymerization may be conducted in suspension in a first step and then in the gas phase in a second step. The suspension prepolymerization is carried out under the conditions described above until a reduced degree of progression of prepolymerization is obtained, preferably less than 20 g of (co)polymer per gram of catalyst.

At this stage, the prepolymer is isolated and then introduced into a gas phase prepolymerization system such as to be converted from the reduced degree of progression of polymerization to the degree of prepolymerization suitable for the subsequent final polymerization process.

This gas phase prepolymerization stage is carried out under conditions that are typical for the gas phase polymerization of ethylene. The filler powder may be added at any stage in the prepolymerization. Preferably, the gas phase prepolymerization is carried out at a temperature ranging from 30° to 110° C. under a total pressure of less than or equal to 20 bars.

The gas phase prepolymerization is continued until a degree of prepolymerization suitable for the subsequent polymerization process is attained. The monomer feed into the reactor is controlled. A desirable average feed rate is less than or equal to 500 Nl×h$^{-1}$×g$^{-1}$ of catalyst.

However, from the standpoint of economy, it is not necessary to remove too much initial filler powder, because the powder recovered is no longer usable and this promotes loss of the catalyst compound agglomerated onto the powder particles. In general, it is preferred to remove the filler powder particles having a diameter greater than 1,000 μm and optionally greater than 500 μm. The particles removed from the catalyst prepolymer to be preserved may be separated off by sieving. Sieving, for purposes of withdrawing the filler powder, is carried out under an inert atmosphere by any known sieving means. The fraction collected beneath the sieve is stored under an inert atmosphere.

The catalyst prepolymer recovered may be used, as such, as catalyst for the polymerization of olefins, in particular $C_2$ to $C_8$ olefins or mixtures thereof, if the amount of cocatalyst is present in excess during the prepolymerization. It may also be used as catalyst in combination with a cocatalyst, as described above.

The subject catalyst for the polymerization of olefins, in the form of prepolymer, is particularly suitable for the gas phase polymerization of olefins and more particularly of ethylene, whether alone or in admixture with an alpha-olefin having from 3 to 8 carbon atoms, to produce polymer powders which have a low content of fine particles ("fines").

In order to further illustrate the present invention and the advantage thereof, the following specific examples are given, it being understood that same are intended only as illustrative and in nowise limitative.

EXAMPLE 1

The following reagents were introduced successively, under a nitrogen atmosphere, into an 8.2 l spherical reactor, which was double-walled to control the temperature and provided with a stirrer system rotating at 100 rev/min, after purging with nitrogen at 60° C.:

(i) 0.5 l of hexane, (ii) 3.5 mM of tri-n-hexylaluminum (THA), (iii) 5 g of a catalyst component based on Mg, Ti and Cl having a D50 of 48 μm and a SPAN of 1.4, (iv) 1 bar of nitrogen, (v) 2 bars of hydrogen, and (vi) 65 Nl of ethylene, over the course of 1 hour, 30 minutes, utilizing a flow control regulator.

The pressure in the reactor was released and 100 g of a linear low density polyethylene (LLDPE) were introduced under a nitrogen atmosphere. The particle size characteristics of this filler powder were:

D50-1,194 μm for a SPAN of 5.26

The hexane was evaporated at 60° C. by sweeping with nitrogen, in order to produce a dry powder.

The following were then added successively at 60° C. while maintaining the stirring:

1 bar of nitrogen, and 2 bars of hydrogen.

The following reagents were then introduced over the course of 3 hours, 30 minutes:

(a) 92 mM of THA, and (b) 350 Nl of ethylene.

After releasing the pressure and purging the reactor, 550 g of powder were recovered under nitrogen.

The particle size fraction larger than 500 μm was removed by sieving under nitrogen using a 500 μm mesh sieve. The extent of polymerization of the prepolymer thus recovered beneath the sieve was assessed.

EXAMPLE 2

The procedure of Example 1 was repeated, except that the low density polyethylene filler powder (ρ=0.920, MI$_2$=1) had the following particle size characteristics: D50=900 μm and SPAN=0.86.

The particle size fraction larger than 1,250 μm was removed by sieving under nitrogen, using an 1,250 μm mesh sieve.

EXAMPLE 3

The procedure of Example 1 was repeated, except that the low density polyethylene filler powder (ρ=0.920, MI$_2$=1) had the following particle size characteristics: D50=1,000 μm and SPAN=0.37.

The particle size fraction larger than 800 μm was removed by sieving under nitrogen, using an 800 μm mesh sieve.

EXAMPLE 4

The procedure of Example 1 was repeated, except that, after evaporation of the hexane, 350 Nl of a 1-butene/ethylene mixture having a molar ratio of 0.0466 were added in place of the 350 Nl of ethylene.

EXAMPLE 5

The procedure of Example 1 was repeated, except that the filler powder was a high density polyethylene (HDPE) having the following particle size characteristics:

D50=902 μm, SPAN=1.08.

COMPARATIVE EXAMPLE 1

The procedure of Example 1 was repeated, except that the particle size fraction larger than 500 μm was not removed by sieving under nitrogen.

COMPARATIVE EXAMPLE 2

The procedure of Example 2 was repeated, except that the particle size fraction larger than 1,250 μm was not removed by sieving under nitrogen.

3 g of prepolymer were then introduced via nitrogen pressure, the injection of nitrogen being continued until the total pressure inside the reactor reached 21 bars.

The pressure in the reactor was maintained at this value by injection of ethylene and 1-butene in a 1-butene/ethylene molar ratio of 0.0466.

After a reaction time of 2 hours, the polymerization was terminated by releasing the pressure in the reactor. The reactor was purged with nitrogen and permitted to cool.

The polymerization results and the characteristics of the powders obtained are reported in the following Table:

TABLE

| | FILLER POWDER | | | PREPOLYMER | | sieve for particle size selection μm | LINEAR POLYETHYLENE OBTAINED | | | |
|---|---|---|---|---|---|---|---|---|---|---|
| Reference prepolymer | Type | D50 in μm | SPAN | D50 in μm | SPAN | | Productivity in gPE/g of catalyst in 2 hours | D50 in μm | SPAN | % fines <250 microns |
| Example 1 | LLDPE | 1195 | 5.26 | 200 | 1.0 | 500 | 20,189 | 1,073 | 1.06 | 0.56 |
| Comparative Example 1 | LLDPE | 1195 | 5.26 | 236 | 1.5 | — | 20,500 | 1,001 | 1.29 | 3.4 |
| Example 2 | LLDPE | 1400 | 0.52 | 217 | 1.1 | 1,250 | 15,000 | 997 | 1 | 0.9 |
| Comparative Example 2 | LLDPE | 1400 | 0.52 | 250 | 1.5 | — | 15,650 | 978 | 1.16 | 2.1 |
| Example 3 | LLDPE | 1000 | 0.37 | 220 | 1.1 | 800 | 15,940 | 1,013 | 1.1 | 0.58 |
| Comparative Example 3 | LLDPE | 1000 | 0.37 | 245 | 1.5 | — | 15,000 | 946 | 1.14 | 1.37 |
| Example 4 | LLDPE | 1195 | 5.26 | 213 | 1.2 | 500 | 20,670 | 1,009 | 1.18 | 1.66 |
| Comparative Example 4 | LLDPE | 1195 | 5.26 | 248 | 1.5 | — | 19,500 | 959 | 1.23 | 2.73 |
| Example 5 | HDPE | 902 | 1.08 | 200 | 1.0 | 500 | 18,254 | 1,062 | 1.15 | 1.16 |
| Comparative Example 5 | HDPE | 902 | 1.08 | 225 | 1.5 | — | 17,980 | 1,000 | 1.26 | 1.9 |

COMPARATIVE EXAMPLE 3

The procedure of Example 3 was repeated, except that the particle size fraction larger than 800 μm was not removed by sieving under nitrogen.

COMPARATIVE EXAMPLE 4

The procedure on Example 4 was repeated, except that the particle size fraction larger than 500 μm was not removed by sieving under nitrogen.

COMPARATIVE EXAMPLE 5

The procedure of Example 5 was repeated, except that the particle size fraction larger than 500 μm was not removed by sieving.

EXAMPLE 6

Polymerization of the Prepolymers of Examples 1 to 5 and Comparative Examples 1 to 5:

The reaction was carried out in a pre-dried 8.2 l reactor provided with a stirrer rotating at 400 revolutions/minute and maintained at 85° C. throughout the polymerization.

1-Butene was injected into the reactor, which was maintained under a vacuum of about 1.33 Pa in the presence of 50 g base stock originating from an identical polymerization experiment until a pressure of 3 bars absolute was attained and 2 bars of hydrogen and 9 bars of ethylene were then injected therein.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the production of a catalyst prepolymer comprising:

prepolymerizing ethylene in a gas phase or in suspension, said ethylene optionally being in admixture with an alpha-olefin comonomer having from 3 to 8 carbon atoms, in the presence of (i) a catalyst system including a catalyst component and a cocatalyst component, said catalyst component containing titanium, magnesium, chlorine and, optionally, an electron donor or electron acceptor; and (ii) filler powder particles; and removing at least part of the filler powder particles after formation of the prepolymer.

2. The process as defined by claim 1, wherein the filler powder is present in an amount from about 5% to 80% by weight of the catalyst prepolymer obtained upon completion the prepolymerization.

3. The process as defined by claim 2, comprising removing the filler powder particles having a diameter greater than 1000 μm.

4. The process as defined by claim 3, comprising removing the filler powder particles having a diameter greater than 500 μm.

5. The process as defined by claim 2, comprising conducting the prepolymerization in suspension in a first step and then in the gas phase in a second step.

6. The process as defined by claim 5, wherein the degree of progression of the suspension prepolymerization is less than 20 g of (co)polymer per gram of catalyst component.

7. The process as defined by claim 2, wherein the filler powder is polyethylene.

8. The process as defined by claim 2, said filler powder having an average particle size greater than D50 of the catalyst times the degree of prepolymerization to the one-third power.

9. The process as defined by claim 8, said filler powder having a D10 greater than D90 of the catalyst times the degree of prepolymerization to the one-third power.

* * * * *